(12) United States Patent
Mohns et al.

(10) Patent No.: US 9,637,037 B1
(45) Date of Patent: May 2, 2017

(54) SEED CART

(71) Applicants: Chad Mohns, Jackson, MN (US);
Wyman Travis, Curlew, IA (US)

(72) Inventors: Chad Mohns, Jackson, MN (US);
Wyman Travis, Curlew, IA (US)

(*) Notice: Subject to any disclaimer, the term of this patent is extended or adjusted under 35 U.S.C. 154(b) by 0 days.

(21) Appl. No.: 14/629,902

(22) Filed: Feb. 24, 2015

Related U.S. Application Data (63) Continuation of application No. 12/857,282, filed on Aug. 16, 2010, now Pat. No. 8,961,098, which is a continuation-in-part of application No. 12/372,021, filed on Feb. 17, 2009, now Pat. No. 8,851,822.

(51) Int. Cl.
 *B60P 1/42* (2006.01)

(52) U.S. Cl.
 CPC ..................... *B60P 1/42* (2013.01)

(58) Field of Classification Search
 CPC ......... B60P 1/42; A01C 15/003; A01C 7/208; A01D 90/105; A01D 41/1217; A01D 41/1208
 See application file for complete search history.

(56) References Cited

U.S. PATENT DOCUMENTS

| | | | |
|---|---|---|---|
| 2,299,702 A | 10/1942 | Mosel | |
| 2,675,947 A | 4/1954 | Wynn | |
| 3,083,879 A | 4/1963 | Coleman | |
| 3,834,564 A | 9/1974 | Laurent | |
| 3,883,005 A | 5/1975 | Stevens | |
| 4,071,226 A | 1/1978 | Miller | |
| 4,226,477 A * | 10/1980 | Capoccia | ............... E21D 9/124 175/62 |
| 4,302,043 A | 11/1981 | Dimmer | |
| 4,432,499 A * | 2/1984 | Henkensiefken | ...... A01K 5/004 241/101.76 |
| 4,577,805 A * | 3/1986 | Seymour | .............. A23N 17/007 241/101.76 |
| 4,768,884 A | 9/1988 | Elkin | |
| 5,094,356 A | 3/1992 | Miller | |
| 5,527,218 A * | 6/1996 | Van den Bossche | A01D 41/142 460/116 |
| 5,845,799 A | 12/1998 | Deaton | |
| 5,924,758 A | 7/1999 | Dimmer | |
| 6,010,022 A | 1/2000 | Deaton | |
| 6,092,974 A | 7/2000 | Roth | |

(Continued)

OTHER PUBLICATIONS

Travis Seed Cart, web page www.hitchdoc.com/travisseedcart.php, accessed Jul. 23, 2009.

(Continued)

*Primary Examiner* — Glenn Myers
(74) *Attorney, Agent, or Firm* — Jeffrey A. Proehl; Woods, Fuller, Shultz & Smith, P.C.

(57) ABSTRACT

A vehicle for transporting bulk seed containers and for transferring seed from the bulk seed containers to a seed planting machine includes a frame; a number of bulk seed container supports attached to the frame, each bulk seed container support supporting a bulk seed container; a feed tube connected to each of the bulk seed container supports, each feed tube engaging a bulk seed container; a delivery tube connected to each feed tube; a funnel commonly connected to the delivery tubes; an auger tube connected to the funnel and an auger to transfer seed to a seed planting machine.

5 Claims, 11 Drawing Sheets

(56) References Cited

U.S. PATENT DOCUMENTS

| | | | |
|---|---|---|---|
| 6,120,233 | A | 9/2000 | Adam |
| 6,325,588 | B1 | 12/2001 | Nolin |
| 6,328,183 | B1 | 12/2001 | Coleman |
| 6,497,546 | B2 | 12/2002 | Wood |
| 6,513,856 | B1 | 2/2003 | Swanson |
| 6,964,551 | B1 | 11/2005 | Friesen |
| 6,971,324 | B1 * | 12/2005 | Beck .................... A01C 15/003 111/200 |
| 6,994,039 | B1 | 2/2006 | Beck |
| 2002/0139817 | A1 | 10/2002 | Travis |
| 2004/0179929 | A1 | 9/2004 | Van Mill |
| 2005/0252999 | A1 | 11/2005 | Truan |
| 2006/0180062 | A1 | 8/2006 | Furrer |
| 2007/0005186 | A1 | 1/2007 | Wietgrefe |

OTHER PUBLICATIONS

PROBOX Seed Handling System, Pioneer Hi-Bred, www.pioneer.com, accessed Jul. 23, 2009.

* cited by examiner

SEED CART

REFERENCE TO RELATED APPLICATION

This application is a continuation in part of U.S. patent application Ser. No. 12/372,021 filed Feb. 17, 2009, pending, which is hereby incorporated herein in its entirety.

FIELD OF THE INVENTION

This invention relates to a seed cart, in particular a seed cart for use with agricultural planting machines such as corn planters. The seed cart is configured to discharge seed from multiple bulk seed containers and other agricultural products, and includes an auger offloading ability to a planter or other agricultural equipment.

BACKGROUND OF THE INVENTION

Agricultural plating machines have grown considerably in size and complexity. Modern machines are presently configured to store and dispense great quantities of seed to facilitate long periods of operation. However, seed for such machines traditionally is sold and distributed in relatively small quantities.

In the past, seed was distributed in 50 lb. bags, and more recently larger "jumbo" bags have been used. The bag concept suffers from a number of drawbacks. The smaller bags are too small to efficiently load a modern planting machine. The larger bags are too heavy to be handled without specialized equipment, and even with equipment they are considered dangerous due to the size and nature of the jumbo bags.

Recently, in part to remedy these problems, seed has been packaged in box-like bulk seed containers such as the Pro-Box. While addressing the safety issues, these containers are not easy to handle and a means to deliver the seed in large quantity to the planters still exists.

A number of manufacturers have begun to produce specialized carts for handling this bulk seed, which can transport the seed to the planters often in the field. These types of carts, however, for the most part resemble traditional bin-type grain carts, which are not particularly well suited for use with the bulk seed containers. For example, the heavy bulk bags must be loaded with a fork lift, or crane, which makes field operation impractical to impossible. In most cases, the seed must be unloaded from the bag or container and dumped into the seed cart bin, which, depending on the circumstances, can range from difficult to impossible.

Accordingly, plainly a need exists for an improved bulk seed cart which can eliminate or substantially eliminate the problems in the art.

SUMMARY OF THE INVENTION

An object of the present invention is to provide a seed cart which provides improved support for a number of bulk seed containers.

Another object of the present invention is to provide a seed cart which allows seed to be readily transported from the seed cart to a seed planter.

These and other objects of the present invention will become apparent to those skilled in the art upon reference to the following specification, drawings, and claims.

BRIEF DESCRIPTION OF DRAWINGS

FIG. 3b is an exploded view of the talc kit of FIG. 3a.

DESCRIPTION OF PREFERRED EMBODIMENTS

Figure 1:
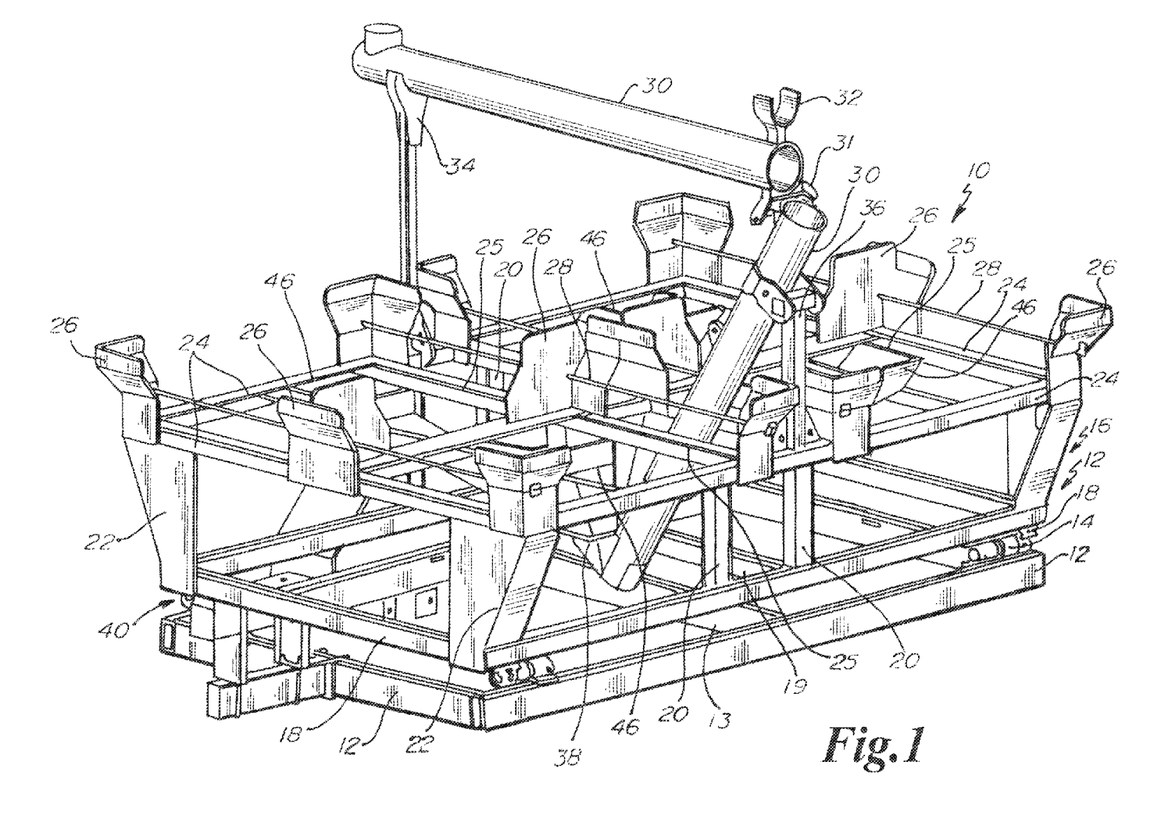
FIG. 1 is a perspective view of a first embodiment of the seed cart of the present invention.
Figure 2:
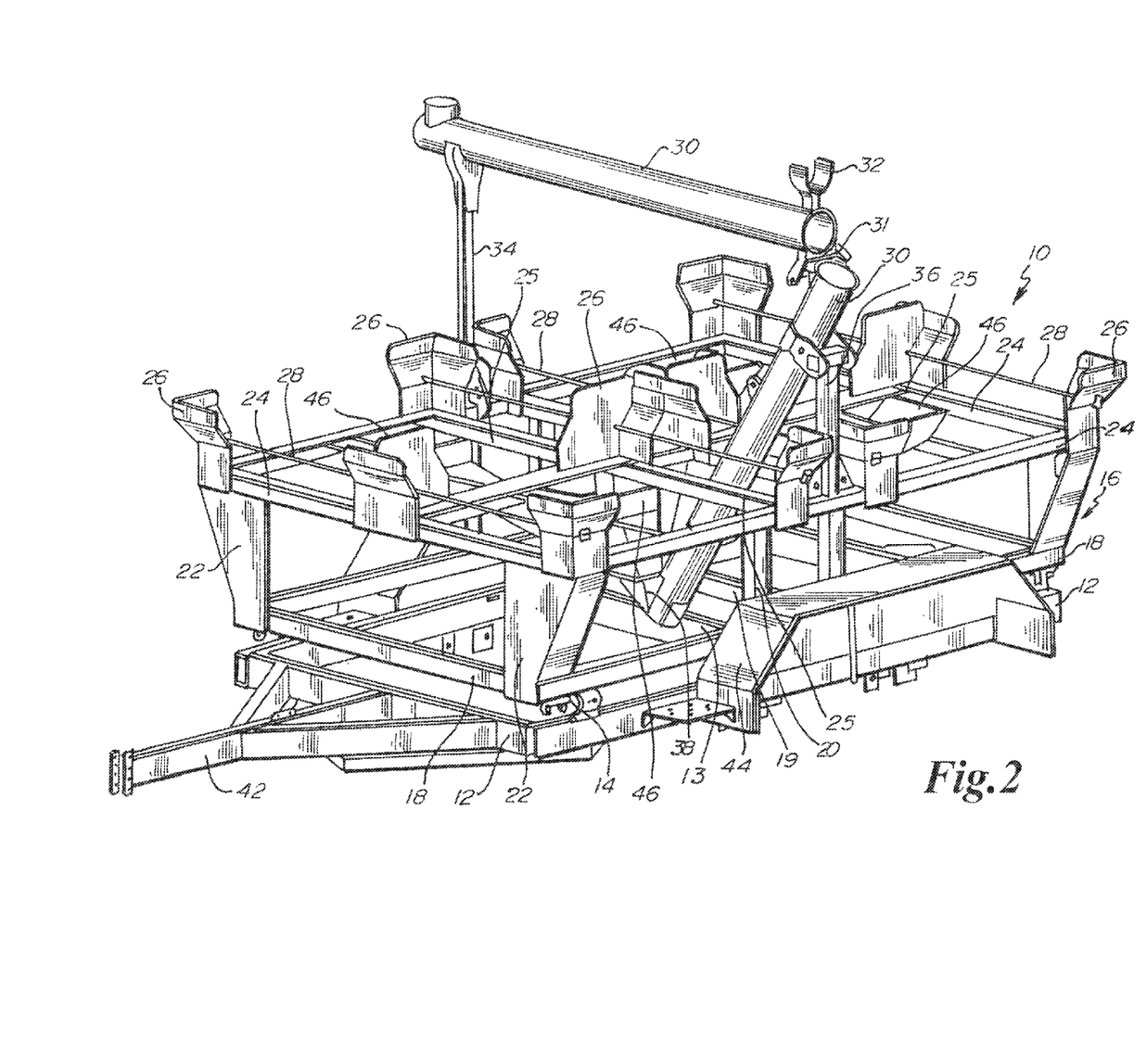
FIG. 2 is a perspective view of a second embodiment of the seed cart of the present invention.
Figure 4:
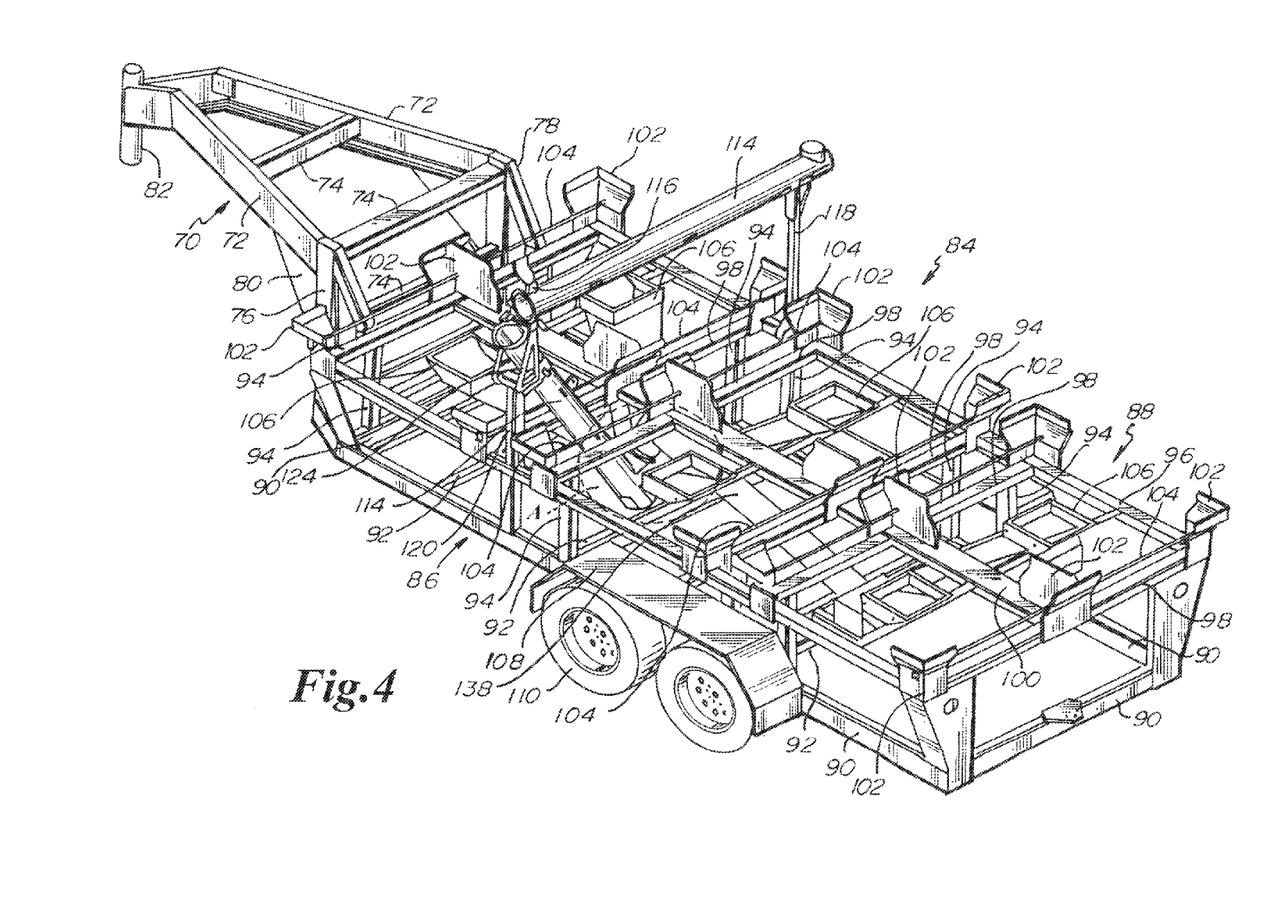
FIG. 4 is a perspective view of a third embodiment of the seed cart of the present invention.
Figure 5:
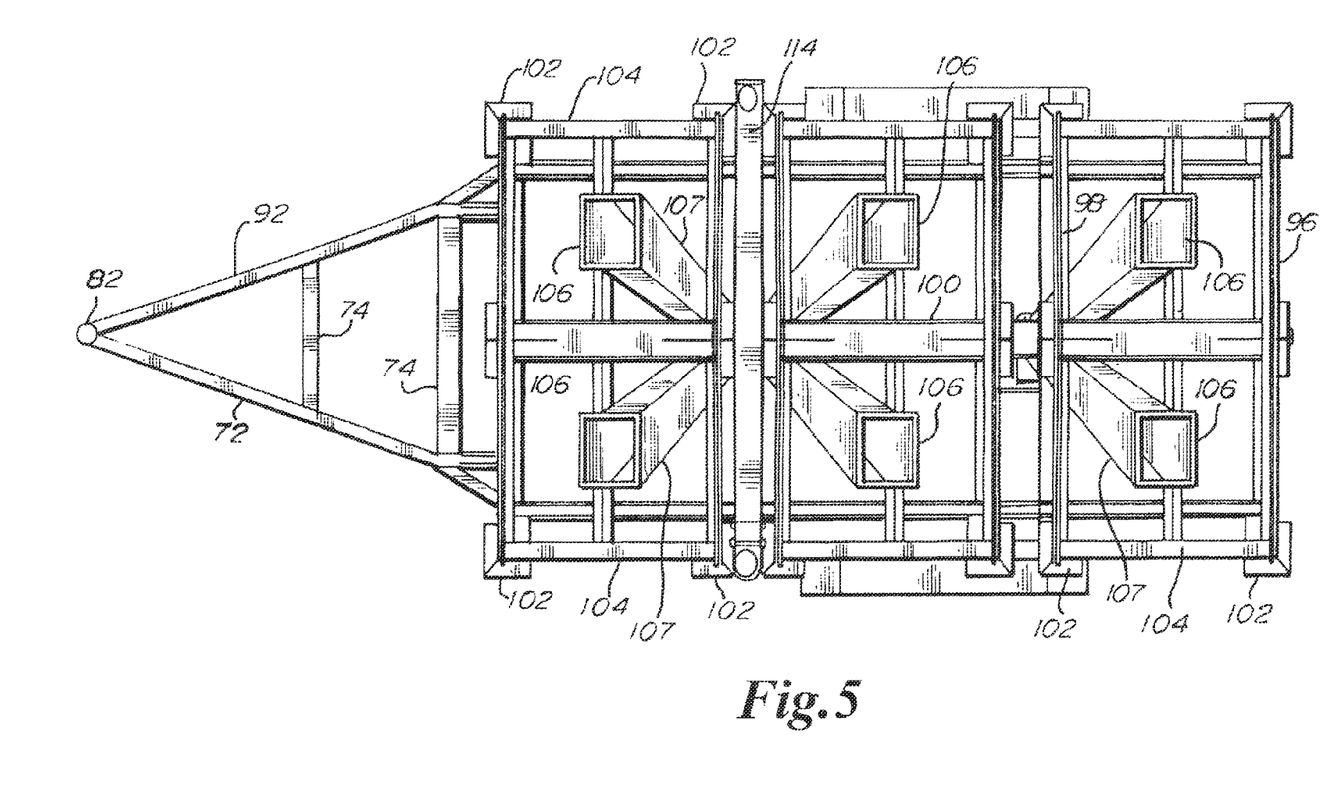
FIG. 5 is a top plan view of the embodiment of FIG. 4.
Figure 6:
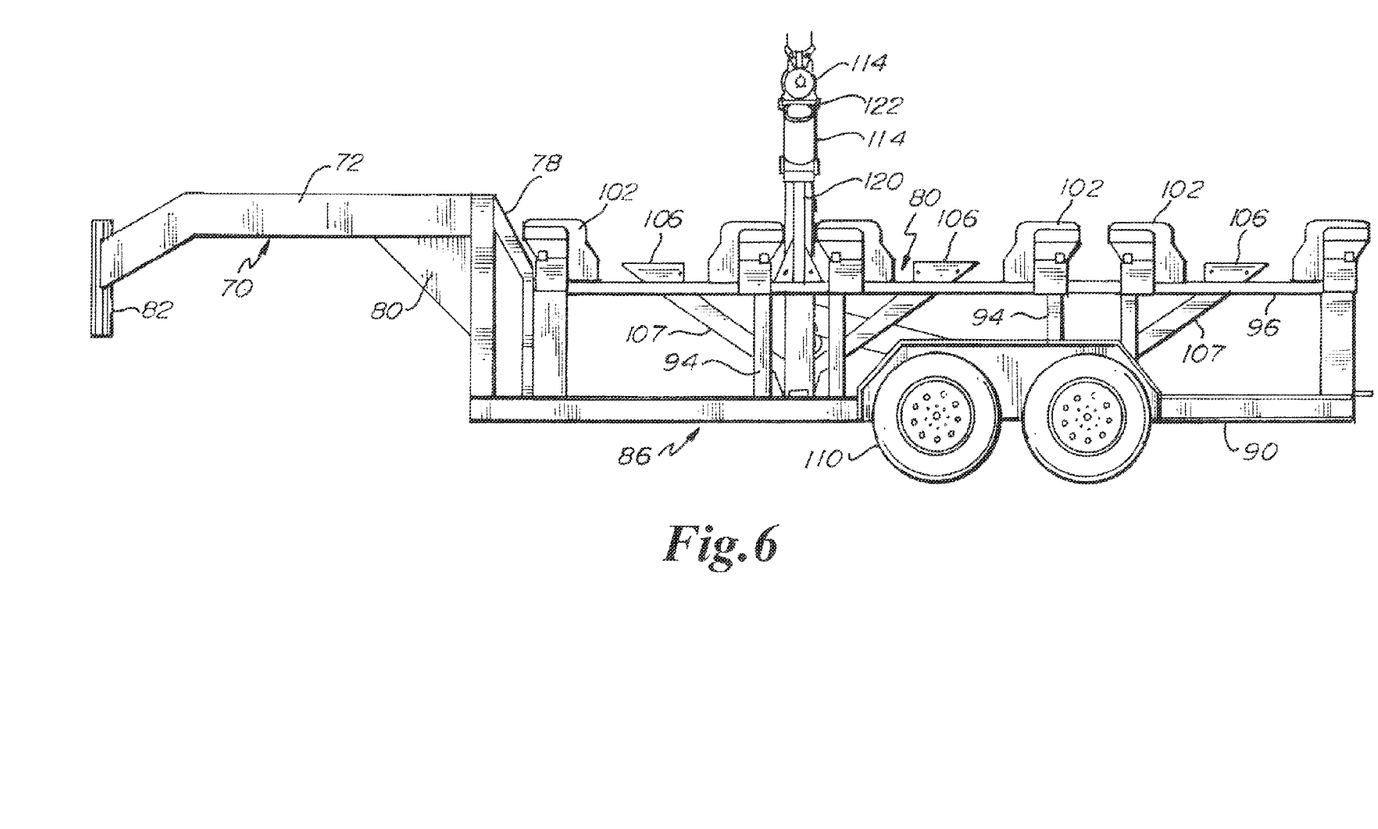
FIG. 6 is an elevational view of the embodiment of FIG. 4.
Figure 7:
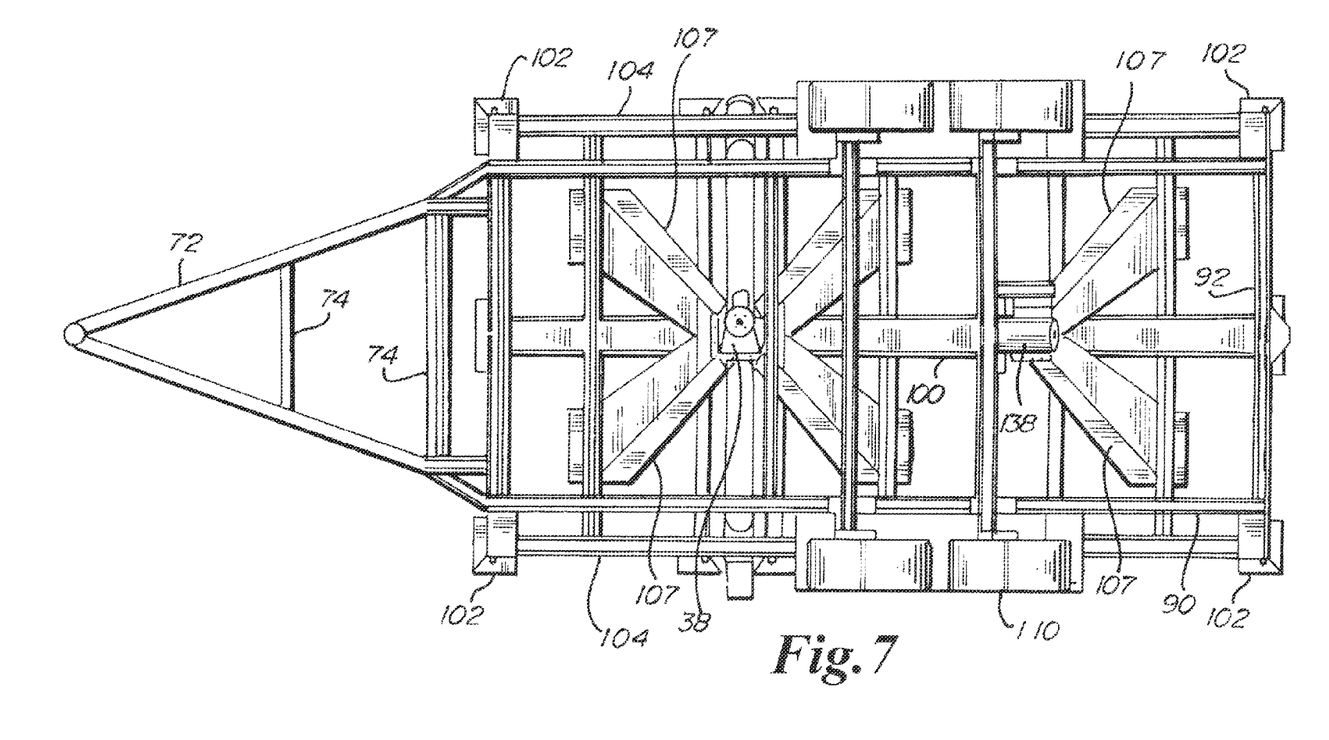
FIG. 7 is a bottom plan view of the embodiment of FIG. 4.
Figure 8:
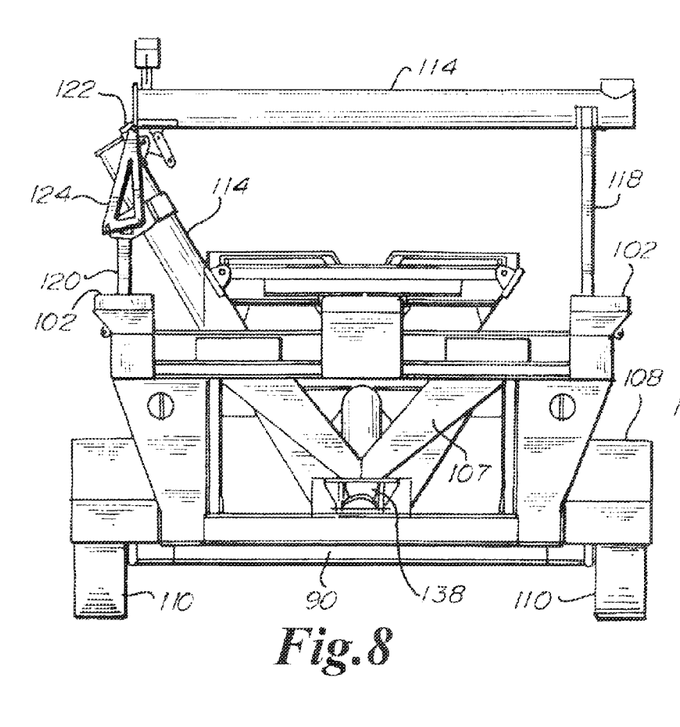
FIG. 8 is a rear elevational view of an embodiment of the seed cart of the present invention.
Figure 9:
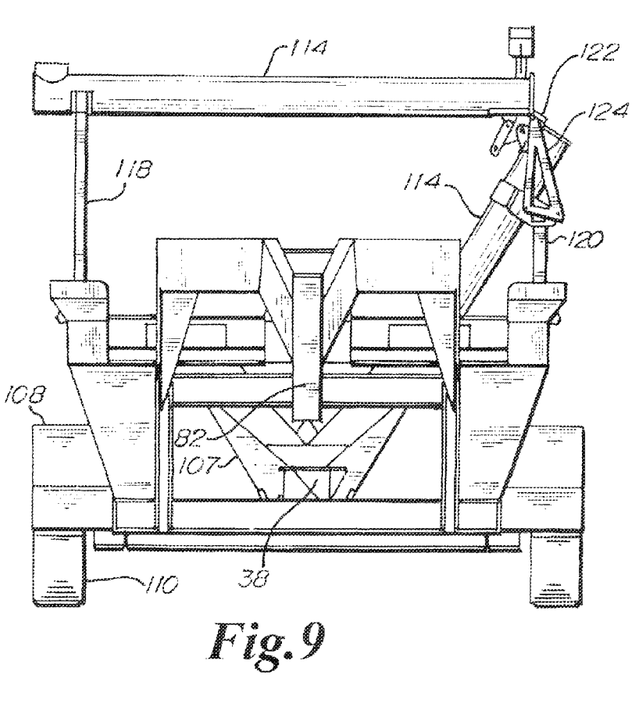
FIG. 9 is a front elevational view of an embodiment of the seed cart of the present invention.

In the Figures, a seed cart 10 is shown. FIG. 1 shows the seed cart 10 configured to receive four bulk seed containers (not shown) such as Pro-Box bulk seed containers. The seed cart 10 shown in FIG. 1 is adapted for mounting to a trailer. FIG. 2 shows a seed cart 10 also configured to receive four bulk seed containers, and is adapted as a stand-alone trailer with capability of receiving wheels (not shown) and a trailer hitch (not shown). FIG. 4 shows a seed cart 10 configured to receive six bulk seed containers and a yoke with a hitch pin adapted for connecting to a truck (not shown).

In particular, as shown in FIG. 1, the seed cart 10 includes a lower frame 11 comprised of a plurality of perimeter frame members 12 and a transverse frame member 13. The lower frame supports an upper frame 16. Conventionally available weigh bars 14 are located between the lower and upper frames 11, 16. The weigh bars 14 are used to determine the amount of seed remaining in the seed cart 10 bulk seed containers, and include a digital readout for this purpose.

The upper frame 16 includes a base 17 which is comprised of a plurality of lower perimeter frame members 18 and a lower transverse frame member 19. Supports 20 extend upward from either side of the seed cart 12 and are connected on their lower end to the lower perimeter frame members 18 of the base 17 and connect on the upper end to upper perimeter frame members 24 of the upper frame 16. The upper perimeter frame members 24 are joined together to form the upper perimeter of the upper frame 16. Inner upper support members 25 are joined to the upper perimeter frame members 24 of the upper frame 16 for lateral support and to complete inner perimeters upon which the four bulk seed containers rest.

Further support to the upper frame 16 is provided by a plurality of corner panel supports 22 located in each corner for the upper frame 16 of the seed cart 12. The corner panel supports 22 extend between the lower perimeter and upper perimeter frame members 12, 24.

Seed container support shields 26 are located in the corners of the upper frame 16, and at the intersection of the upper perimeter frame members 24 and inner upper support members 25. In this manner, the container support shields 26 support each corner of the four bulk seed containers that rest on the upper support members 24, 25. Further support for the bulk seed containers is provided by rails 28, which connect between the container support shields 26 to further define the perimeter of the space provided for each for the four bulk seed containers.

An auger tube 30 is provided to contain an auger (not shown) that will convey and deliver the seed from the bulk seed containers to an agricultural planter (not shown). The auger tube 30 is provided in two sections connected by a hinge 31 to allow the auger tube 30 to move between a transport position and an operational position. A support 36 may support the lower section of the auger tube in an inclined orientation in both positions. A hinge bracket 32 supports the two sections of the auger tube 30 in the operational position, and a support stand 34 supports the upper section of the auger tube 30 in the transport position. The auger tube 30 terminates at its lower end at auger tube funnel 38. The auger tube funnel 38 is the low point of the auger assembly and is connected to feed tubes 46 located in each of the four quadrants of the upper frame 16 of the seed cart 10. In other words, the feed tubes 46 are located in a position to receive seed from the bottom of each of the bulk seed containers, where the seed is gravity fed to the common auger tube funnel 38 for conveyance through the auger tube 30 to the agricultural planter.

FIG. 2 shows an embodiment of the seed cart 10 that differs only in that it includes fenders 44 and a trailer yoke 42. The seed cart 10 shown in FIG. 2 is adapted for use as a stand-alone trailer. Wheels and axles can be attached, as well as a trailer hitch, enabling the seed cart 10 to be towed to and from a working location.

Figure 3A:
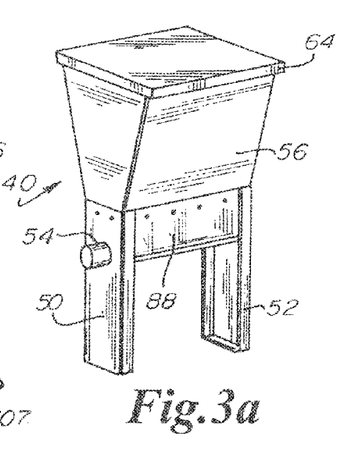
FIG. 3a is a perspective view of a talc kit for use with the seed cart of the present invention.
Figure 3B:
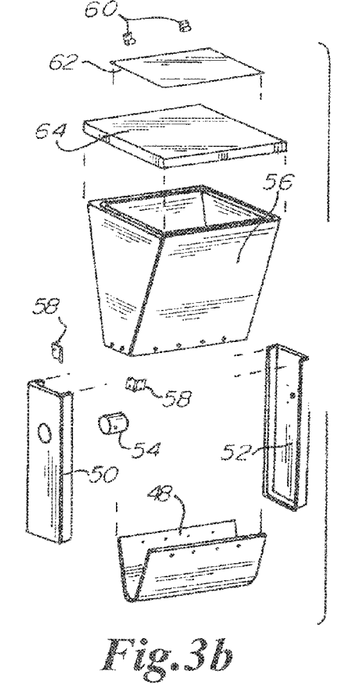

FIG. 3 shows in detail a talc kit 40 of the seed cart 10. The kit 40 dispenses talc in connection with the operation of the seed cart to allow the seed to release freely, especially if the seed has been coated with substances such as insecticides. The kit 40 includes front and rear hopper legs 50, 52 which mount to a hopper bottom 48. The hopper bottom 48 is secured to hopper top 56. A grate 62 is secured within the hopper top 56 with brackets 60. Also provided is an auger outlet 54 which mounts to the hopper bottom 48 through a hole in the front leg 50. The talc kit 40 dispenses talc via an auger (not shown) located in the hopper bottom 48 and is secured with bearing brackets 58. The auger delivers talc to the auger tube 30 at its base where the auger funnels 38 join the auger tube 30.

An additional embodiment of the seed cart 10 is shown in FIGS. 4-11.

The embodiment shown in FIG. 4 provides supports for six bulk seed containers (not shown) such as Pro-Box bulk seed containers.

Starting from the front of the seed cart 10 at the left of FIG. 4, a yoke 70 comprises a side support 72 with cross member 74 terminating in a pin 82 for connecting to a matching hitch on a truck (not shown). Additional supporting structure comprises an upright support 76, a diagonal support 78, and a gusset 80.

The frame 84 of the seed cart 10 comprises a lower frame 86 and an upper frame 88. The lower frame 86 further comprises a lower frame perimeter member 90 and a lower frame cross member 92. The upper frame 88 further comprises an upper frame perimeter member 96, an upper frame cross member 98, and an upper frame center support 100. The wheels 110 may support the frame 84 off of the ground, and the fenders 108 may be mounted on the frame 84, such as on the lower frame perimeter member 90.

One or more horizontal supports 94 are connected between the lower frame 86 and the upper frame 88.

Each of the locations supporting a bulk seed container further comprises seed container support plates 102 and seed container support rails 104. It will be understood that the seed container support plates 102 and seed container support rails 104 cooperate to provide strong support to the seed container (not shown).

Figure 10:
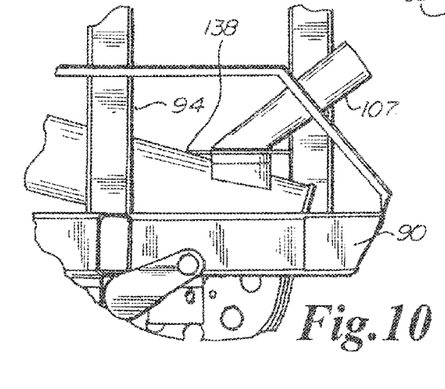
FIG. 10 is a detailed view of the area C of FIG. 6.
Figure 11:
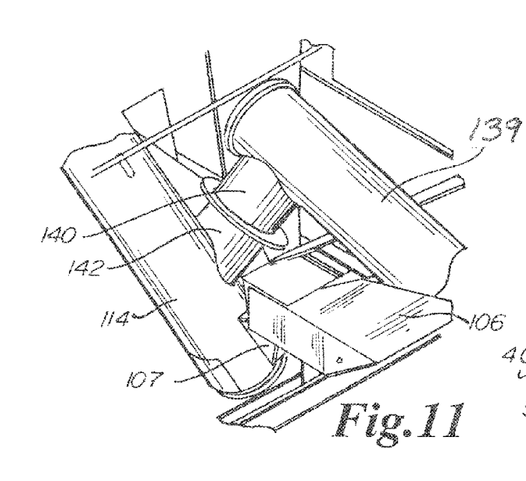
FIG. 11 is a detailed view of the area A of FIG. 4.

At each location supporting a bulk seed container, a feed tube 106 receives seed from the seed container. As best seen in FIGS. 10 and 11, at the rear of the cart, downward-sloping delivery tubes 107 deliver seed from the feed tubes 106 to a rear auger tube funnel 138. An auger (not shown) in the rear auger tube funnel 138 carries seed upwardly and forwardly through an auger tube funnel connector 140 and conjoined auger tube connector 142 to the auger tube 114.

The auger tube 114 is provided in two sections connected by a hinge 122 to allow the auger tube 114 to move between a transport and an operational position. A hinge bracket 116 supports the two sections of the auger tube 114 in the operational position, and a support stand 118 supports the upper section of the auger tube 114 in the transport position. An auger support 120 and auger bracket 124 provide support to the fixed portion of the auger tube 114.

In this manner, the present invention substantially eliminates the problems of previous seed carts.

Figure 12:
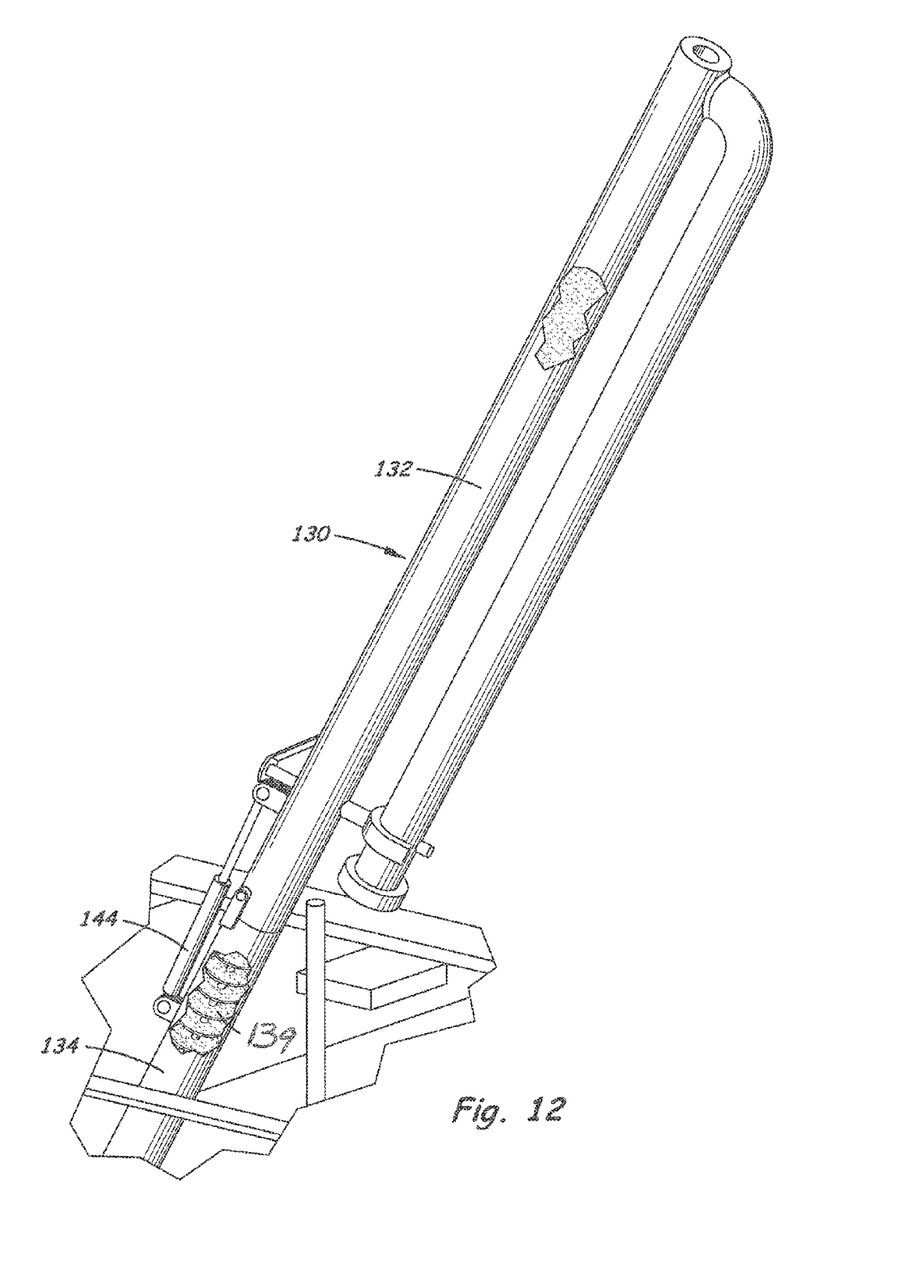
FIG. 12 is a schematic side view of the upper and lower sections of the auger tube shown in the operational position with a portion of the wall of the lower section removed to show the auger positioned therein and a portion of the wall of the upper section removed to show grain positioned in the upper section.
Figure 13:
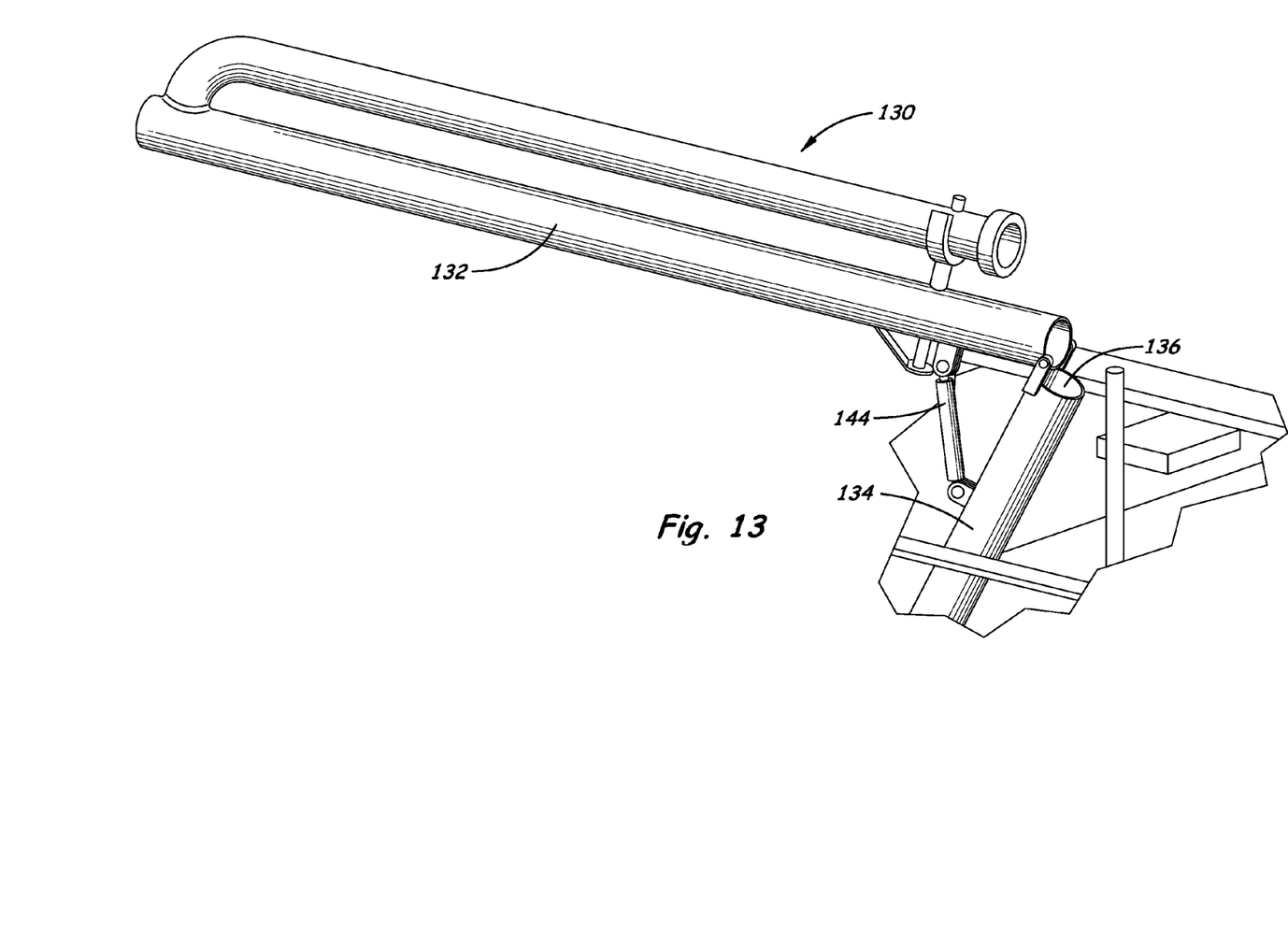
FIG. 13 is a schematic side view of the upper and lower sections of the auger tube shown in the transport position to show the gap between the upper and lower sections.
Figure 14:
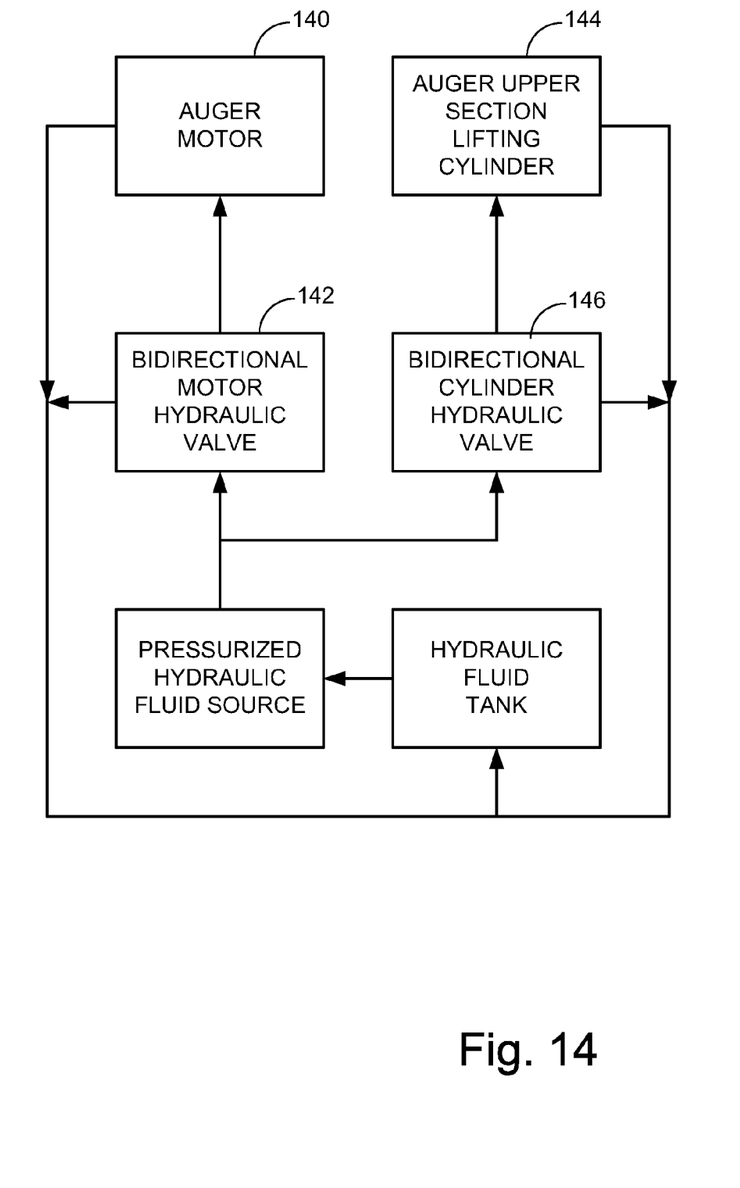
FIG. 14 is a schematic diagram of a hydraulic fluid circuit for controlling the direction of rotation of the auger in the auger tube.

An optional feature for the various embodiments of the seed cart 10, which is illustratively shown in FIGS. 12 through 14, provides the ability to clear seed from a portion of the auger tube 130 when advantageous, Clearing a section of the auger tube 130 of seed may be desirable after filling a planter seed storage compartment with seed, and before the auger tube 130 needs to be moved from the operational position (see FIG. 12) to the transport position (see FIG. 13). This movement of the auger tube 130, and more specifically the movement of the upper section 132 of the auger tube from the operational orientation to the transport orientation with respect to the lower section 134 of the auger tube, may allow seed situated in the interior of the upper section 132 to escape from the interior of the tube and fall to the ground, where it is likely to be wasted. More specifically, the pivot movement of the upper section 132 may cause a gap 136 to be opened in the assembly of the auger tube between the upper 132 and lower 134 sections when the upper section pivots on the hinge. The opening of the gap 136 in the auger tube between the sections may allow any seed remaining in the upper section to fall to the ground. As the length of the upper section 132 of the auger tube may be considerable, the amount of seed that may fall through the gap to the ground and be wasted may be significant.

To facilitate clearing of the upper section 132 of the auger tube of any seed that may remain after the filling operation has been completed, so that seeds will not be spilled through the gap 136, the auger 139 that is rotated in the auger tube 130 to cause the seed in the auger tube funnel to move upwardly through the sections 132, 134 of the auger tube may be reversed in rotational direction to cause movement of the seed in an opposite direction inside the auger tube to move seed remaining in the upper section of the tube out of the upper section 132 so that there is less, if any, seed remaining in the upper section 132 prior to moving the upper section from the operational position to the transport position. Reversing operation of the auger may be best accomplished by reversing operation of the means driving the auger. For example, in the illustrative embodiments, a hydraulic motor 140 is used to rotate the auger, and the flow of hydraulic fluid to the hydraulic motor may be reversed in direction to order to cause the reverse in rotational direction of the auger. Optionally, other means may be used to rotate the auger, and other suitable changes may cause a reversal of the rotation of direction. As a further example, an electric motor may be used to rotate the auger, and a change in electrical polarity supplied to the electric motor will cause a change in rotational direction. In other embodiments, the engagement of different combinations of gears in a gear train may be utilized to reverse the rotational direction.

A control may be provided to cause the reversal of rotation of the motor 140, and as is illustratively shown in FIG. 14, a bidirectional hydraulic valve 142 may be utilized that provides fluid flow in two directions to the motor to permit selection of the auger operation direction for either moving grain in the auger tube to move upwardly from the lower section 134 to the upper section 132, or move downwardly from the upper section to the lower section. Optionally, an auger upper section lifting cylinder 144, and another bidirectional hydraulic valve 146, may be utilized to move the upper section 132 between the transport and operational positions.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described below. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention. Those of ordinary skill in the art that have the disclosure before them will be able to make modifications and variations therein without departing from the scope of the invention.

The invention claimed is:

1. A seed cart for transporting bulk seed containers and for transferring seed from the bulk seed containers to a seed planting machine, the seed cart comprising:
   a frame;
   a plurality of bulk seed container supports attached to the frame, each of the plurality of bulk seed container supports being adapted to support a bulk seed container of said bulk seed containers;
   a feed tube connected to each of the plurality of bulk seed container supports, each feed tube being configured to engage a bulk seed container of said bulk seed containers when the container is supported on a corresponding bulk seed container support of said plurality of bulk seed container supports;
   a delivery tube connected to each feed tube;
   a funnel connected to the plurality of delivery tubes to receive seed from the delivery tubes; and
   an auger tube having a first end connected to the funnel and a second end, the auger tube further comprises a first section connected to the funnel and a second section pivotally connected to the first section so that the second section is pivotable between an operational position in which interiors of the first and second sections are in fluid communication with each other, and a transport position in which a gap is formed between the first and second sections;
   an auger positioned in the first section of the auger tube; and
   a motor connected to rotate the auger so that the auger is operable in a first rotational direction and in a second rotational direction.

2. The seed cart of claim 1 wherein operation of the motor in the first rotational direction causes any seed in the first section of the auger tube to move toward the second section of the auger tube for dispensing, and operation of the motor in the second rotational direction causes any seed in the second section to move toward the first section.

3. The seed cart of claim 1 wherein operation of the motor in the first rotational direction causes any seed in the auger tube to move in an upward direction in the auger tube, and operation of the motor in the second rotational direction permits any seed in the second section to move in a downward direction toward the first section by gravity.

4. The seed cart of claim 1 additionally comprising a user-operable control effective to cause a change in the rotational direction of the motor between the first rotational direction and the second rotational direction.

5. A seed cart for transporting bulk seed containers and for transferring seed from the bulk seed containers to a seed planting machine, the seed cart comprising:
   a frame;
   a plurality of bulk seed container supports attached to the frame, each of the plurality of bulk seed container supports being adapted to support a bulk seed container of said bulk seed containers;
   a feed tube connected to each of the plurality of bulk seed container supports, each feed tube being configured to engage a bulk seed container of said bulk seed containers when the container is supported on a corresponding bulk seed container support of said plurality of bulk seed container supports;
   a delivery tube connected to each feed tube;
   a funnel connected to the plurality of delivery tubes to receive seed from the delivery tubes; and
   an auger tube having a first end connected to the funnel and a second end, the auger tube further comprises a lower section connected to the funnel and an upper section pivotally connected to the lower section so that the upper section is pivotable between an operational position in which interiors of the lower and upper sections are in fluid communication with each other, and a transport position in which a gap is formed between the lower and upper sections;
   an auger positioned in the lower section of the auger tube;
   a motor connected to rotate the auger so that the auger is operable in a first rotational direction and in a second rotational direction; and
   a user-operable control effective to cause a change in the rotational direction of the motor between the first rotational direction and the second rotational direction;
   wherein operation of the motor in the first rotational direction causes any seed in the lower section of the auger tube to move toward the upper section of the auger tube for dispensing, and operation of the motor in the second rotational direction causes any seed in the upper section to move toward the lower section.

\* \* \* \* \*